United States Patent [19]

Kraus

[11] 3,909,760

[45] Sept. 30, 1975

[54] INDUCTIVE TRANSMITTER OF READINGS

[75] Inventor: Heinz Kraus, Traunreut, Germany

[73] Assignee: Firma Dr. Johannes Heidenhain GmbH, Traunreut, Germany

[22] Filed: Dec. 6, 1974

[21] Appl. No.: 530,451

[30] Foreign Application Priority Data

Dec. 6, 1973 Germany ........................... 2360771

[52] U.S. Cl. ................. 336/84; 174/68.5; 336/129; 336/200; 228/312

[51] Int. Cl.² ........................................ H01F 21/04

[58] Field of Search ...... 338/312; 174/68.5; 336/84, 336/129, 192, 200

[56] References Cited

UNITED STATES PATENTS

| | | | |
|---|---|---|---|
| 3,105,869 | 10/1963 | Branch et al. | 174/68.5 |
| 3,117,298 | 1/1964 | Grunwald | 338/312 |
| 3,227,987 | 1/1966 | Place, Jr. | 338/312 |

*Primary Examiner*—Thomas J. Kozma
*Attorney, Agent, or Firm*—Charles E. Quarton

[57] ABSTRACT

An inductive transmitter of readings for measuring paths and angles with two elements movable toward each other and bearing conductor paths. The conductor paths extend into a recess and are soldered to a lead wire.

6 Claims, 1 Drawing Figure

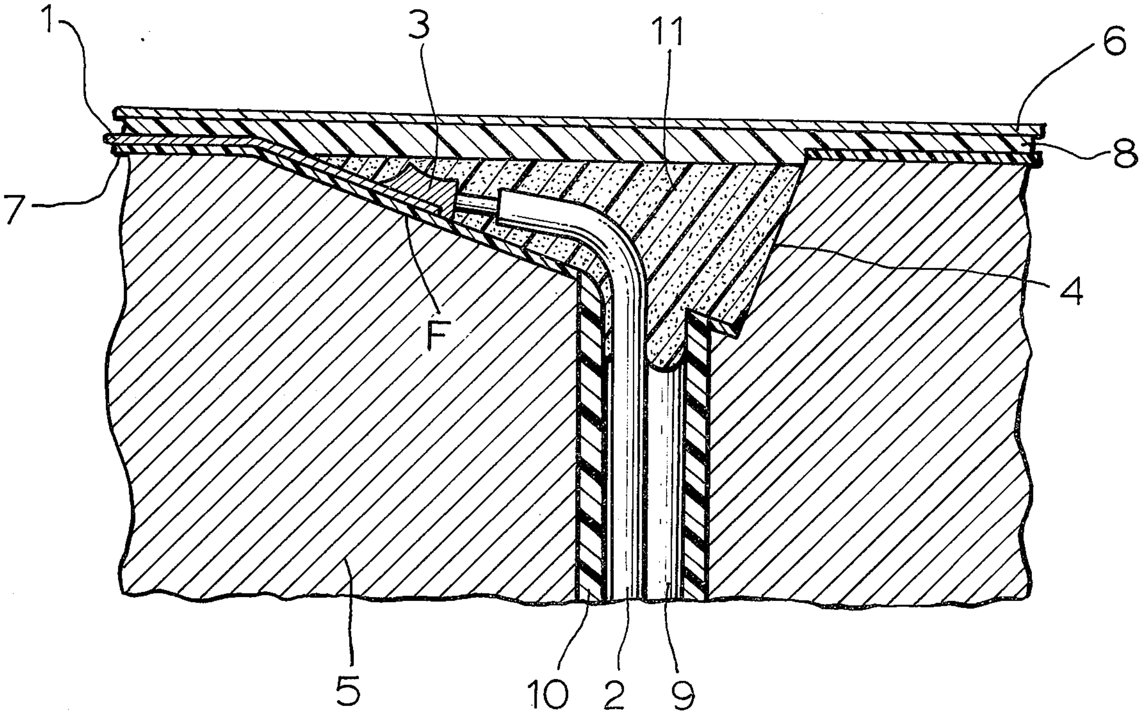
1
3
11
6
8
7
4
F
5
10
2
9

INDUCTIVE TRANSMITTER OF READINGS

The invention relates to an inductive transmitter of readings for measuring paths and angles with two elements movable relatively toward each other and bearing conductor paths.

In the German display copy No. 1,263,327 (corresponding to U.S. Pat. No. 3,064,218), the conductor paths with the soldering points connecting the connective wires are protruding against the supporting body. The danger exists that with the mounting or during the operation of the measuring system the soldering points may become damaged.

In the German petty patent No. 1,958,138, the ends of the conductor paths protrude at right angle into a groove of the supporting body. As a result of this groove in the finished supporting body the surface become discontinuous and danger exists for the topmost layer to sustain damage. Due to the compact space conditions in this groove, soldering of the connecting wires to the angled conductor paths is difficult and unsafe.

The invention is based on the problem of obviating the aforementioned disadvantages and to create a particularly rugged, fail-safe inductive measuring system which also can be produced without particular problems from a viewpoint of production engineering.

The invention solves the problem posed by means of the measures recited in the patent claims.

The drawing shows on an enlarged scale a juncture at the ends of the conductor paths.

An insulation layer 7 is provided at the metallic sensor member 5, the metallic conductor paths 1 being mounted on said layer. An insulating layer 8 and a screening layer 6 are provided on the conductor paths 1. This layer-like structure is prior art in inductive measuring systems. The ends of the conductor paths 1 protrude into a recess 4 of the sensor member 5, whose surface F is inclined toward the plane of the conductor paths to be connected, 1, at a flat angle. By this special shaping of the recess 4 the soldering points 3 also can be produced without difficulties by means of automatic production machines. The soldering points 3 connect the ends of the conductor paths 1 with the connecting wires 2; they are guided through a perforation 9 located in the sensor member 5 and lined with an insulating layer 10. Following completion of the soldering point 3 the recess 4 is filled with a sealing compound 11 of synthetic resin (epoxy resin or polyester resin) so that a continuously plane surface of the sensor member 5 can be produced. The continuous screening layer 6 of the sensor member 5 in this embodiment is a beryllium bronze foil which distinguishes itself by a high resistance against wear. The screening layer 6 is pasted or glued on and secured additionally at the frontal sides of the sensor member 5 by clamping bars (not shown).

What is claimed is:

1. An inductive transmitter of readings for measuring paths and angles comprising two elements movable relatively toward each other and each bearing conductor paths on a sensor member, each of said conductor paths extending into a recess on each sensor member and soldered, on an inclined surface of said recess, to a connecting wire which extends through a perforation in said sensor member, insulating means filling the remainder of said recess.

2. An inductive transmitter of readings, according to claim 1, in which said insulating means comprises a sealing compound.

3. An inductive transmitter of readings according to claim 2, in which said sealing compound comprises a synthetic resin.

4. An inductive transmitter of readings, according to claim 1, in which each said inclined surface is at a flat angle against the conductor paths.

5. An inductive transmitter of readings according to claim 1, further including an exposed screening layer overlying each sensor member and consisting of beryllium bronze.

6. An inductive transmitter of readings, according to claim 5, in which said screening layer is a pasted-on beryllium bronze foil.

* * * * *